US008627460B2

(12) United States Patent
Lee et al.

(10) Patent No.: US 8,627,460 B2
(45) Date of Patent: Jan. 7, 2014

(54) DEVICE FUNCTION RESTRICTING METHOD AND SYSTEM IN SPECIFIC PERIMETERS

(75) Inventors: Kyung-hee Lee, Yongin-si (KR); Tymur Korkishko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2015 days.

(21) Appl. No.: 11/513,047

(22) Filed: Aug. 31, 2006

(65) Prior Publication Data

US 2007/0101426 A1 May 3, 2007

(30) Foreign Application Priority Data

Oct. 27, 2005 (KR) ........................ 10-2005-0101778

(51) Int. Cl.
*H04L 9/00* (2006.01)
(52) U.S. Cl.
USPC ............................................ 726/22; 709/224
(58) Field of Classification Search
USPC ........... 726/1, 11, 12, 22, 23, 24, 25; 713/153
See application file for complete search history.

(56) References Cited

U.S. PATENT DOCUMENTS

| | | | | |
|---|---|---|---|---|
| 5,577,209 A * | 11/1996 | Boyle et al. | | 726/4 |
| 5,832,228 A * | 11/1998 | Holden et al. | | 709/225 |
| 5,940,591 A * | 8/1999 | Boyle et al. | | 726/3 |
| 6,212,558 B1 * | 4/2001 | Antur et al. | | 709/221 |
| 6,272,538 B1 * | 8/2001 | Holden et al. | | 709/223 |
| 6,760,768 B2 * | 7/2004 | Holden et al. | | 709/227 |
| 6,990,591 B1 * | 1/2006 | Pearson | | 726/22 |
| 7,051,365 B1 * | 5/2006 | Bellovin | | 726/11 |
| 7,093,283 B1 * | 8/2006 | Chen et al. | | 726/6 |
| 7,222,359 B2 * | 5/2007 | Freund et al. | | 726/3 |
| 7,286,834 B2 * | 10/2007 | Walter | | 455/456.1 |
| 7,669,225 B2 * | 2/2010 | Peled et al. | | 726/1 |
| 2002/0035635 A1 * | 3/2002 | Holden et al. | | 709/230 |
| 2003/0065944 A1 * | 4/2003 | Mao et al. | | 713/201 |
| 2003/0115313 A1 * | 6/2003 | Kanada et al. | | 709/223 |
| 2004/0034659 A1 * | 2/2004 | Steger | | 707/104.1 |
| 2004/0039580 A1 * | 2/2004 | Steger | | 705/1 |
| 2004/0255147 A1 * | 12/2004 | Peled et al. | | 713/200 |
| 2004/0267551 A1 * | 12/2004 | Yadav | | 705/1 |
| 2005/0010766 A1 * | 1/2005 | Holden et al. | | 713/166 |
| 2005/0055578 A1 * | 3/2005 | Wright et al. | | 713/201 |
| 2005/0063400 A1 * | 3/2005 | Lum | | 370/401 |
| 2005/0066197 A1 * | 3/2005 | Hirata et al. | | 713/201 |
| 2006/0014547 A1 * | 1/2006 | Walter | | 455/456.1 |
| 2006/0094400 A1 * | 5/2006 | Beachem et al. | | 455/410 |
| 2006/0209768 A1 * | 9/2006 | Yan et al. | | 370/338 |
| 2006/0212549 A1 * | 9/2006 | Hokkyo et al. | | 709/220 |
| 2006/0229088 A1 * | 10/2006 | Walter | | 455/456.2 |
| 2006/0250968 A1 * | 11/2006 | Hudis et al. | | 370/241 |
| 2007/0250708 A2 * | 10/2007 | Holden et al. | | 713/166 |
| 2008/0301298 A1 * | 12/2008 | Bernardi et al. | | 709/226 |

* cited by examiner

*Primary Examiner* — Fikremariam A Yalew
(74) *Attorney, Agent, or Firm* — Sughrue Mion, PLLC

(57) ABSTRACT

An apparatus and method for restricting the functions of a device are provided. A restriction monitoring system includes a communication system that provides a location-limited communication channel that detects whether a device entering a perimeter is in an area for device inspection, a server that provides a credential and a security policy to the device and receives a report on whether the device violates the security policy through the location-limited communication channel, and an alarm system which triggers a security alarm when the device violates the security policy.

21 Claims, 5 Drawing Sheets

DEVICE FUNCTION RESTRICTING METHOD AND SYSTEM IN SPECIFIC PERIMETERS

CROSS-REFERENCE OF RELATED APPLICATIONS

This application claims priority from Korean Patent Application No. 10-2005-0101778 filed on Oct. 27, 2005, the entire contents of which are incorporated herein by reference.

BACKGROUND OF THE INVENTION

1. Field of the Invention

Methods and apparatuses consistent with the present invention relate to device function restricting methods and systems in specific perimeters. More particularly, the present invention relates to a device function restricting method and system in specific perimeters for preventing a user from unauthorized use of a device and information leakage, such as, if the user carries a device having a camera function and a memory function in specific perimeters where security is required, the system transmits a credential and a security policy to the device through a perimeter restriction channel and thus restricts a portion of the device functions based on the credential and the security policy.

2. Description of the Related Art

Recently, mobile devices such as mobile phones, personal data assistants (PDAs), and the like have become common. Most people use such mobile devices in order to communicate with other people through transferring media such as voice and images, video, and text image. Such activities through mobile devices are very useful for generating added value for users.

However, there are some places where the functions of such mobile devices should be restricted when such mobile devices are used. First, there are restricted areas for information security where information leakage must be prevented, such as in government agencies, military agencies, business agencies, and the like, where the handling of sensitive resources such as documents, prototype, and the like may occur. Second, there are restricted areas for moral purposes zoned for preventing the violation of others' privacy by use of certain features of a mobile device, such as photographing others in public shower facilities or for keeping individual activities such as enjoying shows in a concert hall or reading books in a library away from others' disturbance. Third, there are radioactive substance restriction areas zoned for protecting sensing equipment of airplanes and the like from interference caused by electromagnetic fields emitted from a mobile device.

Meantime, some technologies use a device carrier to prohibit certain functions of a device in restricted perimeters. In this technology, classification is made into non-technical restrictions and technical limitations. The non-technical restrictions are applied differently from normal restrictions according to administrative, legal, ethical regulations, or the like, and a user can easily compromise with non-technical restrictions. In the case of the technical limitations, the technical limitations are directly or indirectly applied in diverse ways. For example, the interface unit of a device such as a camera, a wired interface unit, or the like is sealed with evidence tamper tape in order for the interface unit to be disabled. In addition, the use of a device is restrained by generation of artificial interference signals as wireless jamming signals. In addition, a survival system such as a camera and a sensor is used to monitor how the user follows the security policy. In addition, it has the use of the device removed by a request of the device carrier in order for some functions to be abandoned before the user enters a restriction (or referred to as location-limited) area.

However, current technical limitations have a problem of hardly providing reliable blocking. Only the removal of mobile devices and the monitoring of mobile device users can effectively solve the problem. However, the removal activities of mobile devices from users can give rise to an additional physical problem. That is, the users may need their mobile devices for daily telephone calls to their homes, business meeting adjustments, or legitimate activities such as private communications.

Accordingly, special technologies are required which temporarily disable some functions of a mobile device in specific perimeters.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a device function restricting method and system for specific perimeters, and more particularly to a device function restricting method and system for specific perimeters for preventing a user from using a device in an illegal manner and facilitating information leakage, if the user carries a device having a camera function and a memory function with him or her in specific perimeters where security is required, by transmitting a credential and a security policy to the device through a perimeter restriction channel and thus restricting a part of the device functions based on the credential and the security policy.

According to an aspect of the present invention, there is provided a device function restriction monitoring system, including: a communication system for providing a location-limited communication channel that detects whether a device has entered a perimeter is in an area which requires inspection of the device; a server for providing a credential and a security policy to the device and receiving a report on whether the device violates the security policy through the location-limited communication channel; and an alarm system for triggering a security alarm when the device violates the security policy.

The communication system may include a location-limited communication subsystem for reporting a monitoring state of the area for inspection of the device to the server; and communication subsystems for supporting communication channels other than the location-limited communication channel.

The device may be a mobile communication terminal or a PDA communicating through a mobile communication network, the credential may be a key or a random challenge, and the other communication channels are any of a wireless link, a wired link, and an optical link.

The server may include a system memory for storing the security policy for using device resources, the credential generated as to the device, and a reference state of the device that enters into the perimeter; a server processor for executing software loaded on the system memory; and an input-output (I/O) system for inputting and outputting data.

According to another aspect of the present invention, there is provided a device including a system memory for storing a credential and a security policy received from a monitoring system located in a perimeter and storing control software carrying out the security policy; a device processor for controlling execution of the control software; and an input/output (I/O) system for performing communications with a monitoring system.

The system memory may additionally store a reference state of the device that entered into the perimeter and a current state of the device when moved out of the perimeter, and the device processor may report security policy violations to the monitoring system through the I/O system when the device violates the security policy.

The device resources may include source resources for calculating information inside the device and sink resources consuming the information acquired by the source resources, and the source resources and the sink resources may include hardware resources and software resources.

According to another aspect of the present invention, there is provided a device function restriction method, comprising (a) receiving a credential and a security policy from a monitoring system, and transmitting a reference state with the security policy applied to source resources in a state that a device enters a perimeter to the monitoring system; and (b) controlling use of the source resources by the device according to the security policy, and reporting content transformation of a device state to the monitoring system, in a state that the device is located in the perimeter.

In operation (a), the device may calculate an acknowledgement, using the credential, and transmit the calculated acknowledgement to the monitoring system.

The calculation of the acknowledgement may be the calculation through processing of the credential, information addition, and encryption hash function including SHA-1 or MD5.

If a local acknowledgement of the monitoring system is matched to the acknowledgement after transmitting the acknowledgement, the generated security policy is received from the monitoring system.

In operation (a), the device may report the reference state using the source resources to which all the security policies are applied to the monitoring system, and the monitoring system may store the reference state in a database.

In operation (b), information transformation from the source resources may be specified by control software according to the security policy, and the transformed information may be provided to sink resources including encryption, substitution, and information deletion.

According to another aspect of the present invention, there is provided a device function restricting method, including (a) providing a credential and a security policy to a device entering a perimeter; (b) receiving from the device a reference state with the security policy applied to source resources; (c) receiving a report on content transformation of the reference state from the device; and (d) restricting specific functions or prohibiting use of the source resources according to the reported state of the device.

The operation (a) may include detecting existence of the device in an area of the perimeter for device inspection, and transmitting the credential and the security policy to the device through a location-limited communication channel.

The operation (a) includes receiving an acknowledgement calculated by the device using the credential, and, if the acknowledgement is received, calculating a local acknowledgement using the credential, and transmitting the security policy to the device if the acknowledgement is matched to the local acknowledgement.

The operation (c) includes transforming the reference state into a previous state by control software when the device violates the security policy, and receiving a report on the previous state from the device.

The operation (c) includes receiving the credential from the device, and triggering a security alarm through an alarm system when the credential is not matched to a previously stored credential.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF THE EXEMPLARY EMBODIMENT

Figure 1:
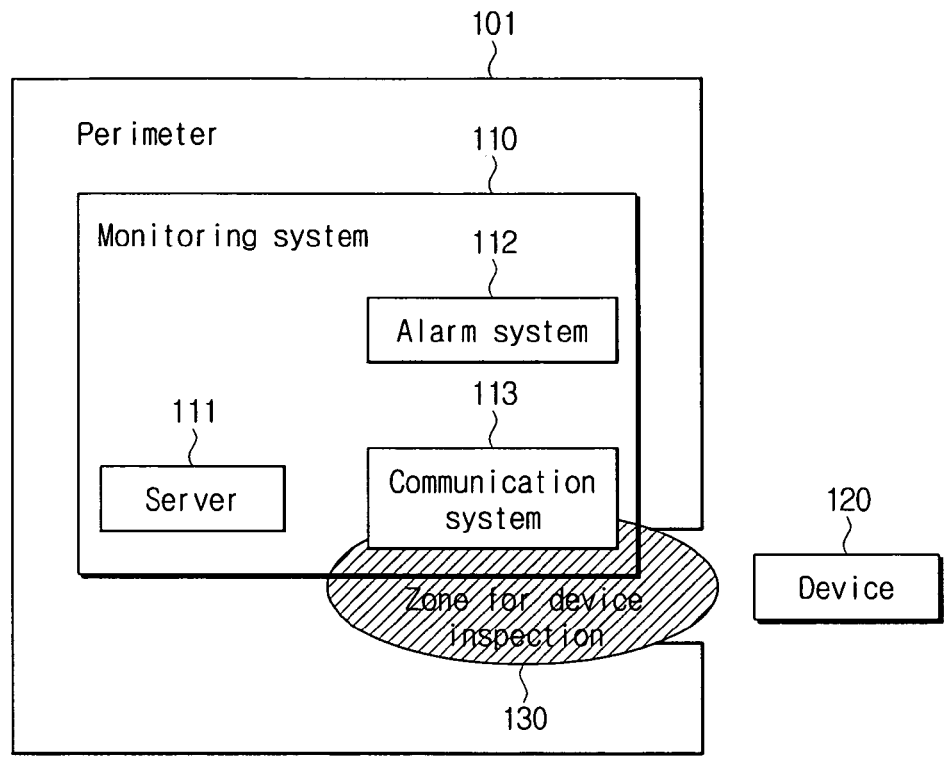
FIG. 1 is a view for schematically showing a configuration of a device function restricting system according to an exemplary embodiment of the present invention.

Hereinafter, description will be made in detail on certain exemplary embodiments of the present invention with reference to the accompanying drawings.

It is noted that like reference numerals are used as long as possible to denote like parts or elements even though shown in different drawings in assigning the reference numerals to constituent parts or elements of each drawing.

For better understanding of the present invention, detailed description on well-known structures or functions will be avoided if it is judged that concrete description on the structures or functions distracts the gist of the present invention.

FIG. 1 is a view for schematically showing a configuration of a device function restricting system according to an exemplary embodiment of the present invention.

The device function restricting system according to the present invention includes a monitoring system 110 and a device 120.

The monitoring system 110 is located within a perimeter 101, and provides a credential and a security policy to the device 120 to restrict some functions of the device 120, and takes back the credential and the security policy from the device 120 upon repeal of the restriction of some functions.

If the device 120 enters the perimeter 101 where security is required, the device 120 becomes imposed with restriction of some functions through communications with the monitoring system 110. The device 120 can be a mobile communication terminal or a PDA, for example, which communicates via mobile communication networks.

The perimeter 101 has at least one entrance and one exit which are controlled by the monitoring system 110.

The monitoring system 110, as shown in FIG. 1, has a configuration including a server 111, alarm system 112, and communication system 113.

Figure 3:
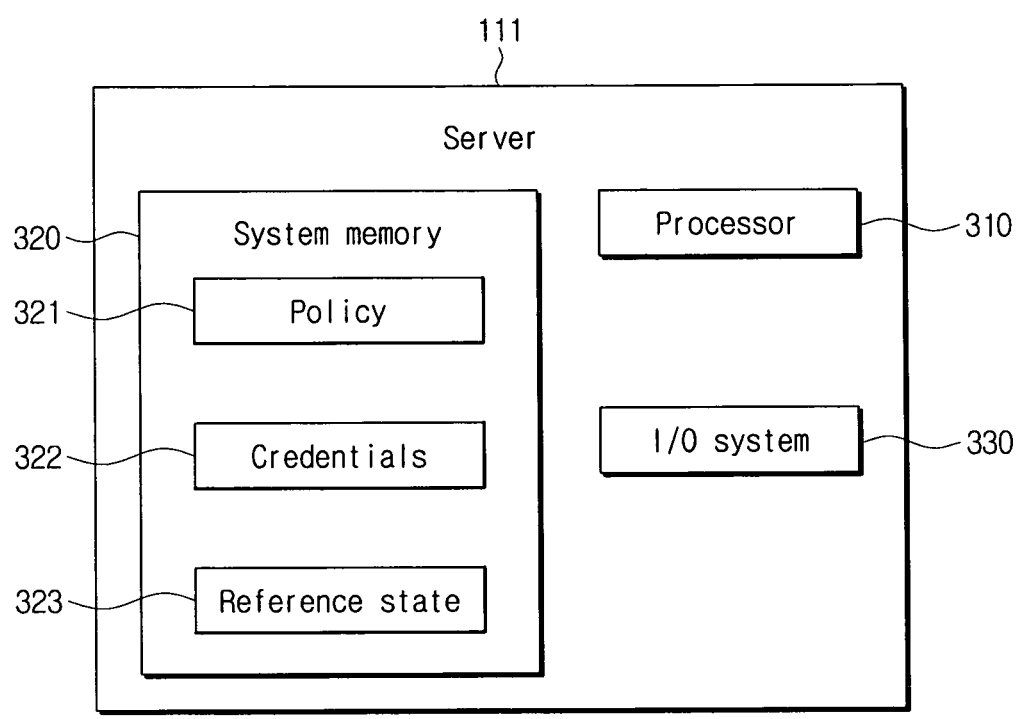
FIG. 3 is a view for schematically showing an internal configuration of a server of a monitoring system according to an exemplary embodiment of the present invention.

The server 111, as shown in FIG. 3, has a configuration including a processor 310, system memory 320, and input-output (I/O) system 330. The server 111 executes software loaded in the system memory 320 and controlled by the processor 310. The system memory 320 has a database containing a server policy 321 for using device resources, a server credential 322 generated for the device, and a reference state 323 of the device that has entered the perimeter. The server credential 322 contains a key, random challenge, or the like. The I/O system 330 performs data transmissions and receptions.

The alarm system 112 is used by the server 111 in order to report monitoring states different from a usual state to users of the monitoring system 110.

Figure 2:
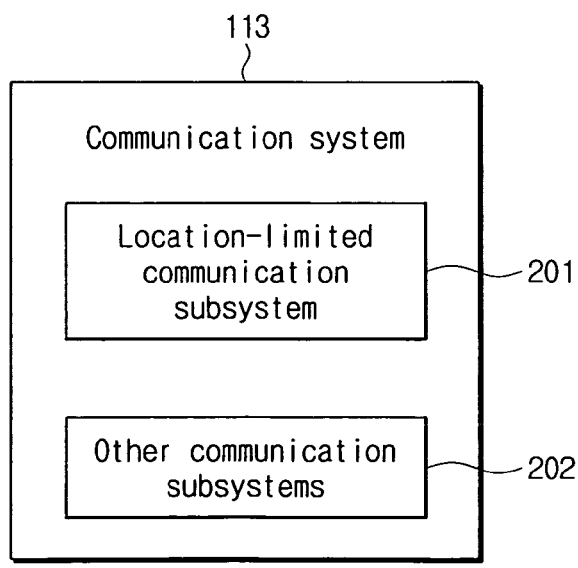
FIG. 2 is a view for schematically showing an internal configuration of a communication system according to an exemplary embodiment of the present invention.

The communication system 113 supports communication processing through a location-limited communication channel between the server 111 and the device 120, and has a configuration including a location-limited communication subsystem 201 and other communication subsystems 202, as shown in FIG. 2.

If the device 120 is a mobile communication terminal, the location-limited communication channel is separated from a main communication link such as a mobile communication network, and has special security features against data transmissions beyond a short radio wave propagation distance.

The location-limited communication channel supports demonstrative identification, i.e., identification based on physical situations such as approach of a physical device. The best supporting communication technologies have inherent physical limitations on transmissions.

In addition, the location-limited communication channel disables attackers from transmitting through the channel, or at least supports authenticity to transmit activities which are not detected by permitted participants.

The location-limited communication channel supporting demonstrative identification and authenticity includes, for example, a contact channel, infrared channel, near-field signaling across the body channel, sound and ultrasound channel, optical image exchange channel, short range wireless channel such as Zigbee and Bluetooth, or the like.

The location-limited communication subsystem 201 reports the monitoring state of the area for device inspection 130 to the server 111. The location-limited communication channel is effective in the area for device inspection 130.

The other communication subsystems 202 provide other communication channels such as a wireless link, wired link, optical link, and the like, in order to transmit information between the server 111 and the device 120.

Figure 4:
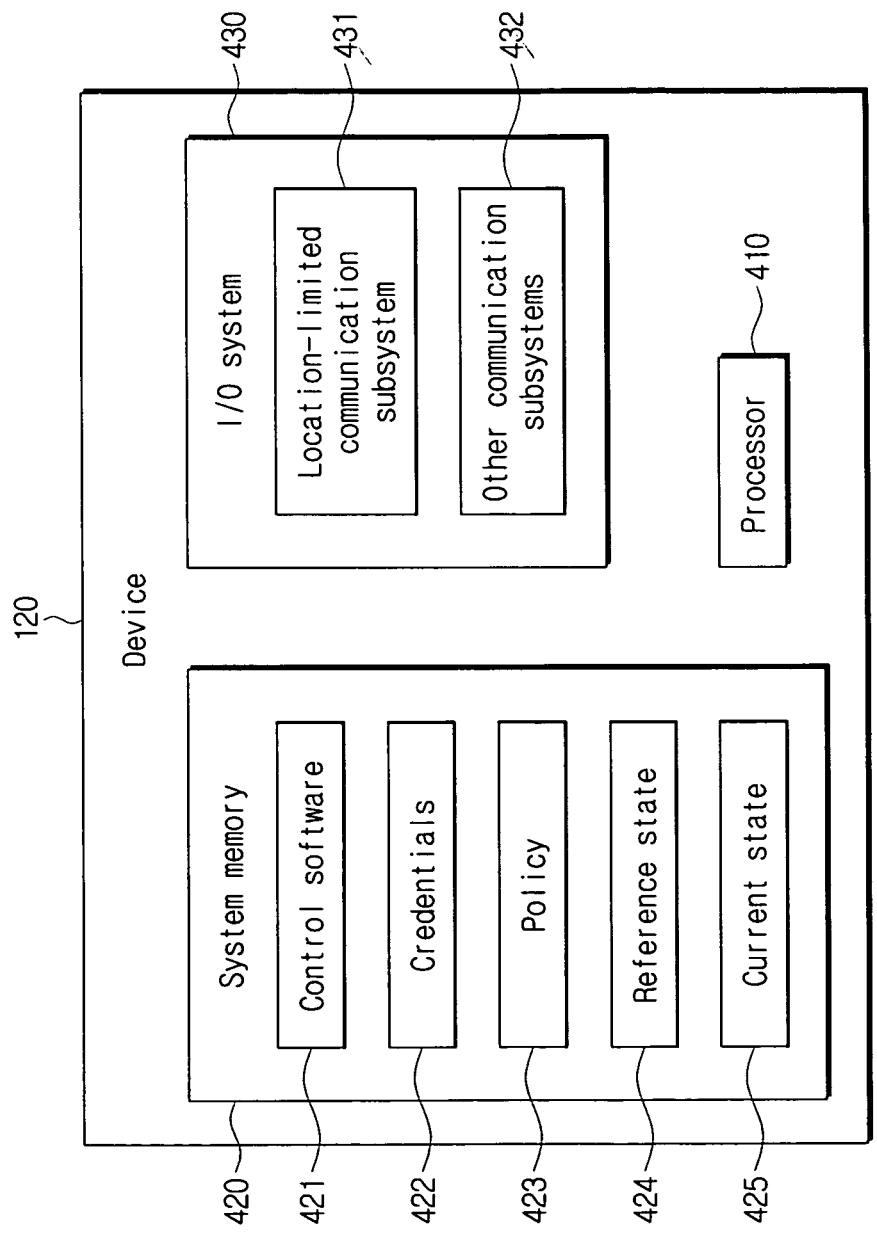
FIG. 4 is a view for schematically showing an internal configuration of a device according to an exemplary embodiment of the present invention.

Meantime, as shown in FIG. 4, the device 120 has a configuration including a processor 410, system memory 420, and I/O system 430.

The device 120 executes control software 421 loaded on the system memory 420 and controlled by the processor 410. Further, the processor 410 can read other software out of the system memory 420 and execute pieces of software in parallel.

The system memory 420 of the device 120 contains a security policy 423 for using device resources, device credential 422 for a device, reference state 424 of a device that has entered a perimeter, and current state 425 of a device moved out of a perimeter. Further, the system memory 420 contains control software 421 that applies the device policy 423 to the device resources.

The I/O system 430 supports communications between the device 120 and the server 111, and has a location-limited communication subsystem 431 and other communication subsystems 432.

Figure 5:
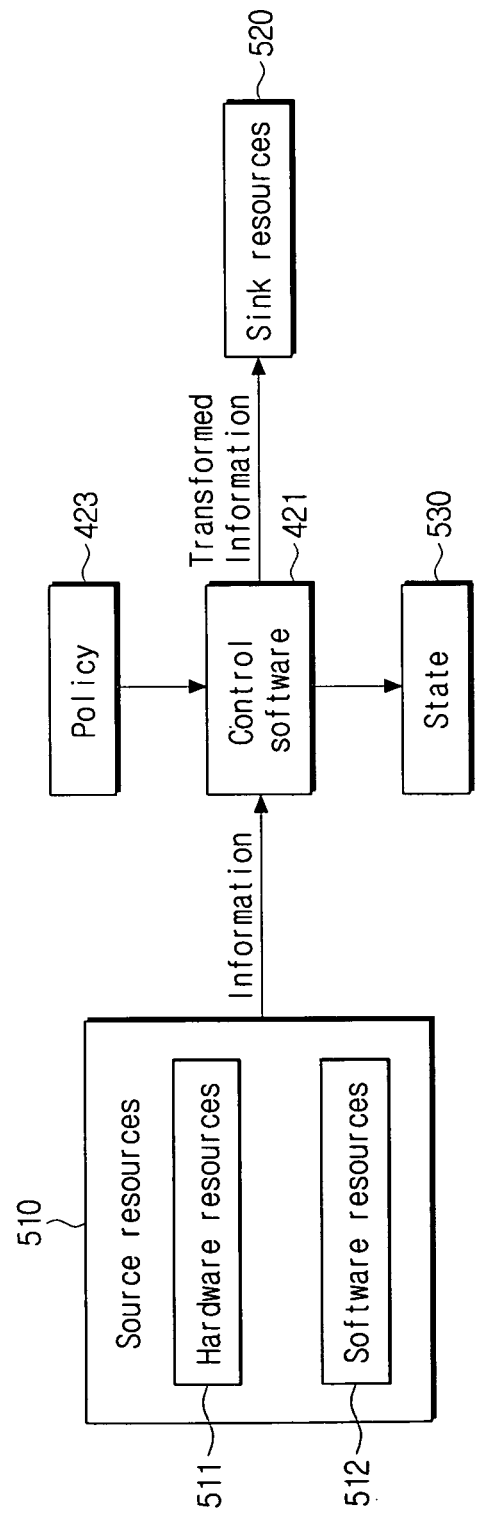
FIG. 5 is a view for showing source and sink resources of the device according to an exemplary embodiment of the present invention.

Further, as shown in FIG. 5, the device resources are categorized into source resources 510 and sink resources 520. The device resources 510 and 520 include hardware resources 511 and software resources 512.

The source resources 510 calculate information inside a device. For example, camera software calculates images, communication software sends information from a device to outside, and a user interface calculates input information.

The sink resources 520 consume the information acquired by the source resources 510. For example, the main body of an external device receives information from the device, and the storage medium in the device stores the information.

Next, description will be made on the operations of the device function restricting system configured as above.

Figure 6:
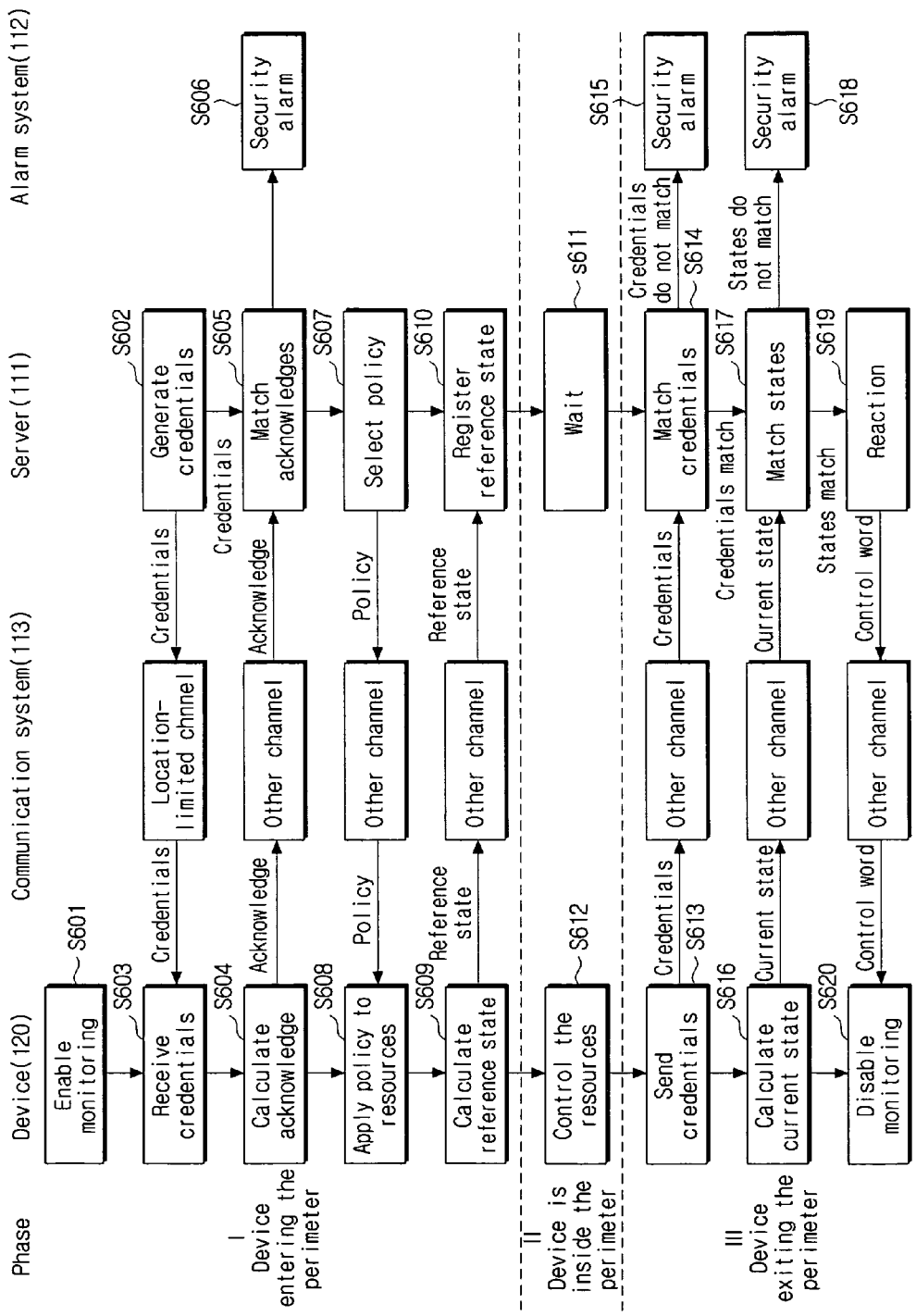
FIG. 6 is a flow chart for showing processing procedures of a device function restricting method according to an exemplary embodiment of the present invention.

FIG. 6 is a flow chart for showing processing procedures of a device function restricting method.

The present invention operates the device 120 in three phases to detect unauthenticated usages of device functions.

The first phase is a state of the device entering a perimeter, the second phase is a state of the device locating in the perimeter, and the third phase is a state of the device existing in an area for inspection within the perimeter.

In the first phase, the device 120 enters an area for device inspection 130. At this time, the monitoring function of the device is in the enabled state (S601).

The communication system 113 of the monitoring system 110 detects the existence of the device 120 in the area for device inspection 130, and reports the result of detection to the server 111. The server 111 generates a server credential 322, stores the server credential in a database, and transmits the server credential 322 to the device 120 through the location-limited communication channel (S602). For example, the transmitted credential is not limited to the credential transmitted through a infrared channel, the images displayed on an optical output device such as a monitor, television set, or the like, modulated sound or ultrasound, local wireless link, and so on, including the location-limited communication channel.

Meantime, the device 120 receives the server credential 322 transmitted by the server 111 (S603). Next, the device 120 calculates an acknowledgement, using the server credential 322, and transmits the calculated acknowledgement to the server 111 (S604). The acknowledgement calculations include credential processing, information addition, and calculations of encryption hash function such as SHA-1 or MD5. The device 120 transmits the acknowledgement to the server 111. All the communications started from the step S604 between the device 120 and the server 111 are performed through the location-limited communication channel or other communication channels.

The server 111 uses the server credential 322 generated in the step S602 in order to calculate a local acknowledgement, and matches the local acknowledgement to the acknowledgement received from the device 120 (S605).

If the local acknowledgement is not matched to the received acknowledgement, the server 111 deletes the server credential 322 for the device stored in the database, and triggers a security alarm through the alarm system 112 (S606). The security alarm indicates that the device 120 has not received a valid server credential 422 from the server 111.

However, if the local acknowledgement is matched to the received acknowledgement, the server 111 selects the device policy 423 for the device 120, and transmits the selected device policy 423 to the device 120 (S607). The server 111 and the device 120 that have performed the step S607 use the credential for information transformation security therebetween through a communication channel.

The device 120 receives the device policy 423 from the server 111, and applies the device policy 423 to the source resources 510 through the control software 421 (S608).

The application of the device policy 423 is that the control software 421 calculates a reference state 424 of the device 120 using the information on the state 530, and transmits the calculated reference state 424 to the server 111 (S609).

The reference state 424 of the device 120 shows such a state of the device 120 that the device policy 423 uses the source resources 510 to which all the device policy 423 is applied. For example, the calculations of such a state are to calculate a memory check code using a device integrity check technologies.

The server 111 receives the reference state 424 from the device 120, and registers the reference state 424 in the database (S610).

Next, the device 120 and the server 111 enter the second phase.

The server 111 in this state waits for the device 120 existing in the perimeter 101 (S611), and the device processor 410 in the device 120 controls the use of source resources 510 through the control software 421 (S612). The control software 421 detects the use of the source resources 510, and reports the content change of the state 530. The state 530 reflects the response of the control software 421 to the fact that the source resources 510 have been used. Then, all the unauthenticated usages of the device 120 are recorded according to the change of the state 530.

Additionally, a variant of the control software 421 can transform the information from the source resources 510 before the variant is sent to the sink resources 520. Special transformation of the information is defined according to the device policy 423, and the transformation of the information from the source resources 510 is specified according to the device policy 423 as noticed.

The sink resources 520 are provided in a transformed form. The examples including such transformations are not limited to the encryption with other information, substitution, information deletion (which does not provide any information to the source resources 520), and the like. Then, the information is transformed from the source resources 510 to the sink resources 520 by the control software 421, and the information leakage of the device 120 in the perimeter is prevented by the sink resource 520.

The device 120 and the server 111 stay in the second phase until the device 120 does not exist in the perimeter 101. If the device 120 moves from the perimeter 101 to the area for device inspection 130, the server 111 and the device 120 enter the third phase.

In the third phase, the device 120 sends the device credential 422 to the server 111 (S613). The server 111 receives the device credential 422 from the device 120, searches for the server credential 322 stored in the step S602, and matches the device credential 422 to the stored server credential 322 (S614).

If the two credentials are not matched, the server 111 triggers the security alarm through the alarm system 112 (S615). The security alarm indicates that the device 120 has provided a failed credential 422 to the server 111. However, if the two credentials are matched, the server waits for a device execution state 425 from the device 120.

The device 120 calculates the device execution state 425, using the information on the state 530, and transmits the calculated device execution state 425 to the server 111 (S616). The device 120 uses a simple method to calculate the device execution state 425 as in the step S609. If the device violates the device policy 423, the control software 421 changes the state 530. Then, the calculation result of the device execution state 425 becomes different from the initial reference state 424 calculated when the device 120 does not violate the device policy 423.

The server 111 searches the database for the reference state 323 of the device 120 which has been stored in step S610, and matches the device execution state 425 to the reference state 323. If the two states are not matched, the server 111 triggers a security alarm through the alarm system 112 (S618). The security alarm indicates that the device 120 has been used in the unauthenticated manner, violating the device policy 423.

However, if the two states are matched, the server 111 transmits a control word to the device 120 (S619). The device 120 receives the control word from the server 111. Further, the device 120 stops controlling the use of the device resources 510 through the control software 421. The monitoring function of the device 120 is then disabled (S620).

As aforementioned, the present invention can prevent the illegal use of a device such as a mobile communication terminal or a PDA in a specific perimeter, and prevent information leakage caused by the use of specific functions.

The aforementioned is merely an illustrative description on the spirit of the present invention, and various changes and modifications can be made by those skilled in the art to which the present invention pertains without departing from the essential features of the present invention.

Accordingly, the disclosed exemplary embodiments of the present invention are not for limitation of the spirit of the present invention but for description thereon, so the scope of the spirit of the present invention is not limited by the exemplary embodiments.

The scope of the present invention should be construed by the appended claims, and all the spirit within the equivalency should be construed to be included in the scope of the present invention.

What is claimed is:

1. A device function restriction monitoring system comprising:
   a communication system which provides a location-limited communication channel to detect whether a device entering a perimeter is in an area for device inspection;
   a server which provides a credential and a security policy to the device and receives a report on whether the device violates the security policy through the location-limited communication channel; and
   an alarm system which triggers a security alarm if the device violates the security policy;
   wherein the device comprises a system memory having the credential, the security policy, a reference state which indicates a state of the resources of the device when the security policy is applied, and a current state which indicates a state of the resources of the device after use of the device;
   wherein the device sends the reference state and the current state to the server, the server storing the reference state and current state; and
   wherein the server compares the reference state and the current state to determine if the device has violated the security policy.

2. The system as claimed in claim 1, wherein the server comprises:

a system memory which stores the security policy for using device resources, the credential provided to the device, and the reference state of the device;

a server processor which executes software loaded on the system memory; and an input-output system which inputs and outputs data.

3. The system as claimed in claim 1, wherein the communication system comprises:

a location-limited communication subsystem which reports a monitoring state of the area for device inspection to the server; and communication subsystems which supports other communication channels besides the location-limited communication channel.

4. The system as claimed in claim 3, wherein the other communication channels comprise at least one of a wireless link, a wired link, and an optical link.

5. The system as claimed in claim 1, wherein the device comprises a mobile communication terminal communicating through a mobile communication network.

6. The system as claimed in claim 1, wherein the device comprises a personal data assistant communicating through a mobile communication network.

7. The system as claimed in claim 1, wherein the credential comprises a key or a random challenge.

8. A device comprising:

a system memory which stores a credential and a security policy received from a monitoring system located in a perimeter and stores control software carrying out the security policy, and further stores a reference state which indicates a state of the resources of the device when the security policy is applied, and a current state which indicates a state of the resources of the device after use of the device;

a device processor which controls execution of the control software; and an input/output (I/O) system which performs communications with a monitoring system;

wherein the device processor reports a change in current state to the monitoring system through the I/O system; and wherein the monitoring system compares the reference state and the current state to determine if the device has violated the security policy.

9. The device as claimed in claim 8, wherein the reference state of the device is the state in which the device enters into the perimeter and a current state of the device is the state in which the device exits the perimeter.

10. The device as claimed in claim 8, wherein device resources comprise source resources for calculating information inside the device and sink resources consuming the information acquired by the source resources.

11. The device as claimed in claim 10, wherein the source resources and the sink resources comprise hardware resources and software resources.

12. A device function restriction method comprising:

(a) receiving a credential and a security policy from a monitoring system, and transmitting a reference state with the security policy applied to source resources in a state that a device enters a perimeter to the monitoring system; and (b) controlling, by a processor of the device, use of the source resources according to the security policy, and reporting content transformation of a device state to the monitoring system, in a state that the device is located in the perimeter;

wherein the content transformation of the device state is compared to the reference state to determine if the device has violated the security policy.

13. The method as claimed in claim 12, wherein, in (a), the device calculates an acknowledgement, using the credential, and transmits the calculated acknowledgement to the monitoring system.

14. The method as claimed in claim 13, wherein the acknowledgement is calculated by processing of the credential, information addition, and encryption hash function including SHA-1 or MD5.

15. The method as claimed in claim 14, wherein, if a local acknowledgement of the monitoring system is matched to the acknowledgement after the device transmits the acknowledgement, the generated security policy is received from the monitoring system.

16. The method as claimed in claim 12, wherein, in (a), the device reports to the monitoring system the reference state using the source resources to which all the security policies are applied, and the monitoring system stores the reference state in a database.

17. The method as claimed in claim 12, wherein, in (b), information transformation from the source resources is specified by control software according to the security policy, and the transformed information is provided to sink resources including encryption, substitution, and information deletion.

18. A device function restricting method comprising:

(a) providing, by a monitoring system, a credential and a security policy to a device entering a perimeter;

(b) receiving, from the device, a reference state with the security policy applied to source resources;

(c) receiving, from the device, a report on content transformation of the reference state; and (d) restricting, by the device, specific functions or prohibiting use of the source resources according to the reported state of the device;

wherein (c) comprises transforming the reference state into a previous state by control software when the device violates the security policy, and receiving a report on the previous state from the device; and wherein the report on content transformation is compared to the reference state to determine if the device has violated the security policy.

19. The method as claimed in claim 18, wherein (a) comprises detecting existence of the device in an area for device inspection of the perimeter, and transmitting the credential and the security policy to the device through a location-limited communication channel.

20. The method as claimed in claim 18, wherein (a) comprises receiving an acknowledgement calculated by the device using the credential, and, if the acknowledgement is received, calculating a local acknowledgement using the credential, and transmitting the security policy to the device if the acknowledgement is matched to the local acknowledgement.

21. The method as claimed in claim 18, wherein operation (c) comprises receiving the credential from the device, and triggering a security alarm through an alarm system when the credential is not matched to a previously stored credential.

* * * * *